United States Patent Office 3,261,125
Patented July 19, 1966

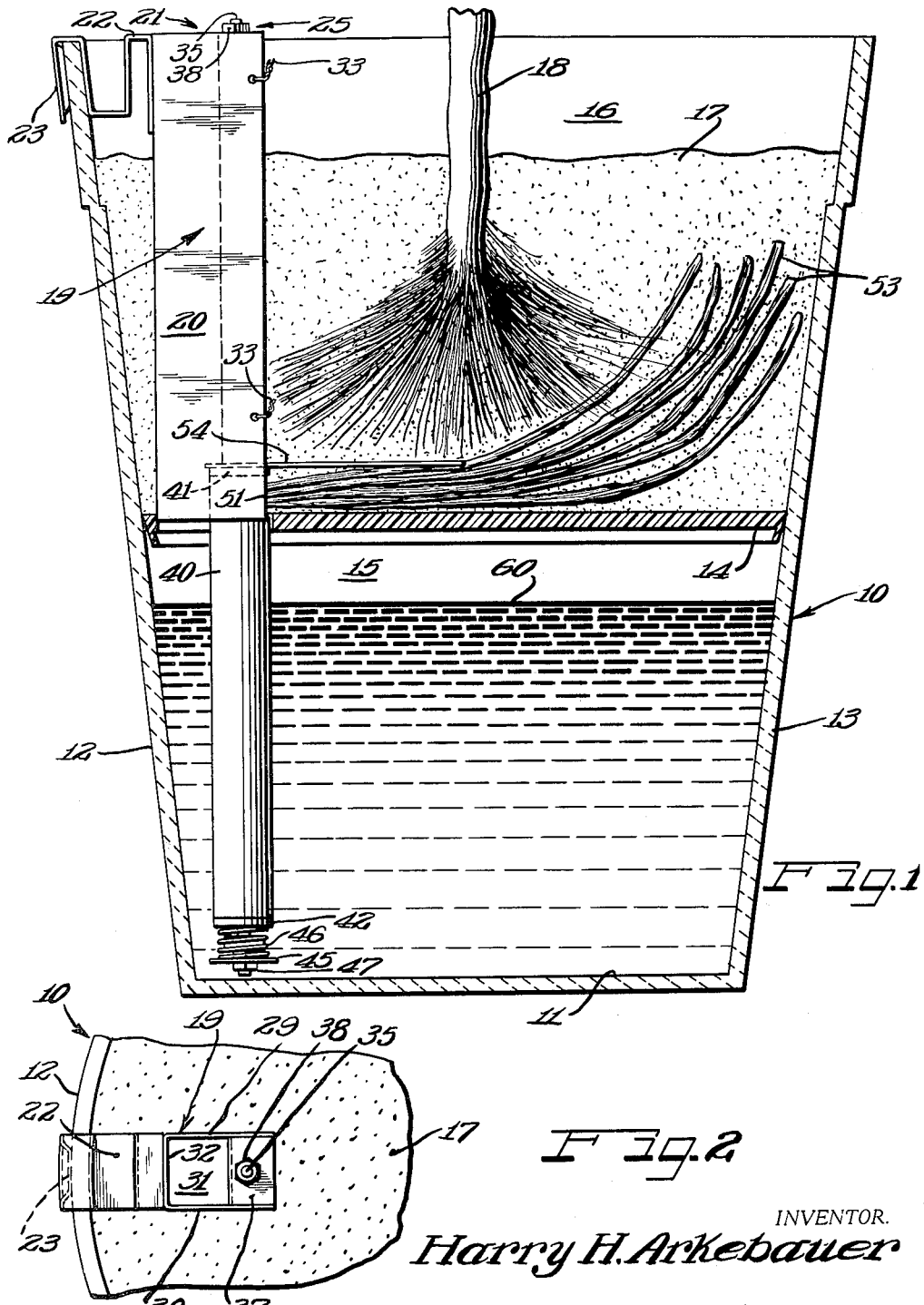

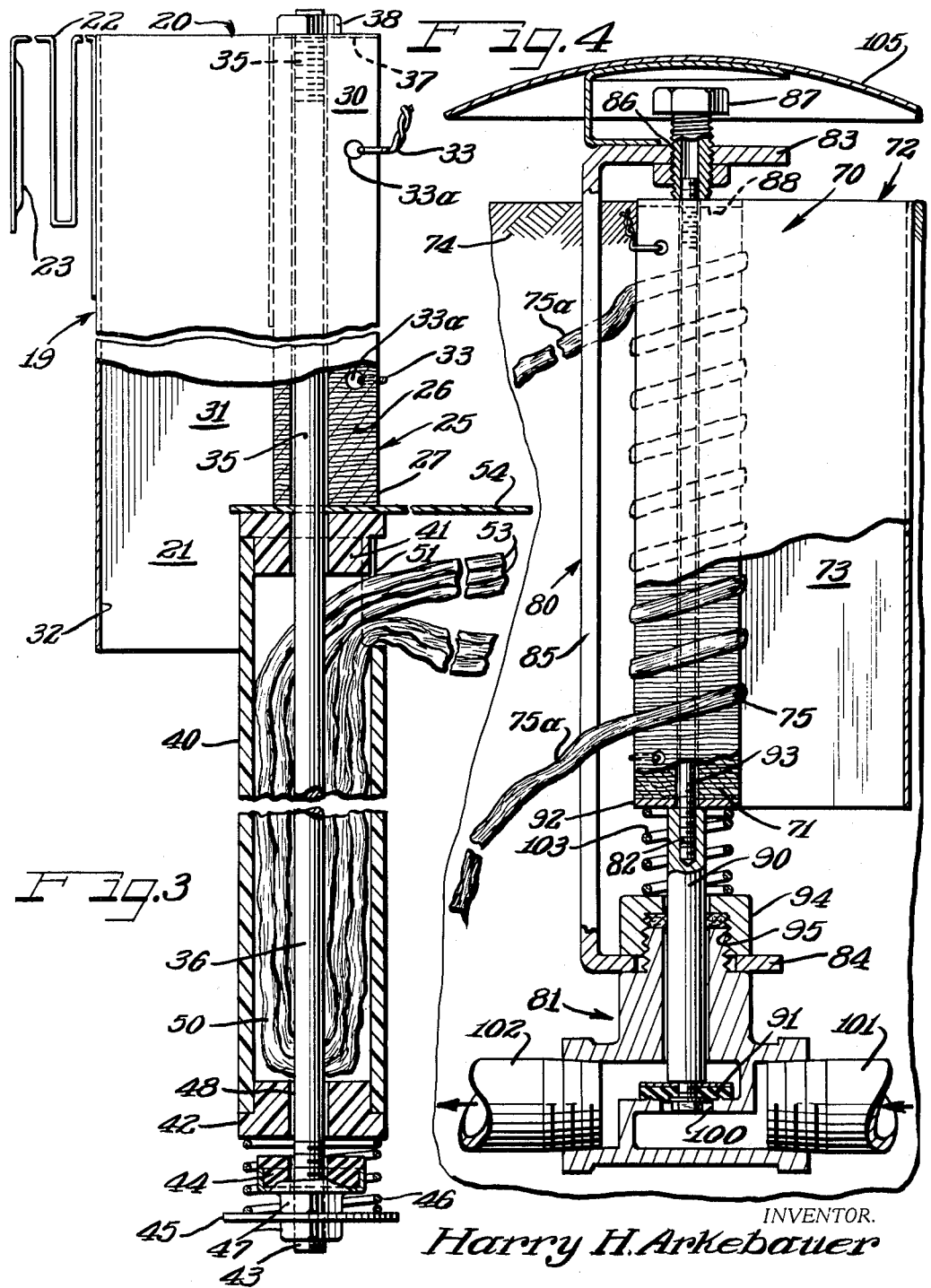

3,261,125
SYSTEM FOR CONTROLLING THE MOISTURE
CONTENT OF SOIL
Harry H. Arkebauer, 828 Smith Ave., Ferguson, Mo.
Filed June 15, 1964, Ser. No. 375,045
10 Claims. (Cl. 47—38.1)

This invention relates to a system for controlling the moisture content of soil, and more particularly to a system that is controlled by a moisture-responsive, sensing element maintained in direct contact with the soil and expansible or contractible in accordance with the moisture content that it derives from the soil, whereby the element serves to control the supply of water to the soil in accordance with the moisture requirements of plants growing therein.

My present invention is applicable not only to containers, such as flower pots, tubs, planters or the like, for growing segregated plants, but also for the irrigation of sizable plots of land, such as lawns, gardens and the like. The moisture-responsive element that I have found best suited for use in the control and operation of such a system is a section of wood, preferably redwood, having exposed grain ends for contact with the soil the moisture content of which is to be regulated. If an elongated column or block of a section of wood is maintained in contact with the soil, with the grain of the wood at right angles to the height of the column or block and with the grain ends in contact with the soil, the column or block will expand lengthwise as it picks up moisture from the soil and will contract as it releases moisture to the soil or to the atmosphere. Thus, through suitable connections between such a moisture-responsive element and a valve-controlled source of water, the element can be used to control the flow of water to the soil to control water in accordance with the existing moisture content of the soil so as to maintain such moisture content at a desired level for optimum plant growth.

It is therefore an important object of this invention to provide a system for controlling the moisture content of soil in accordance with the needs of plants growing therein by the use of an element that is positioned in the soil and that expands or contracts in response to the moisture content of the soil with which it is effectively in contact.

It is a further important object of this invention to provide an automatic plant watering device in which the supply of water thereto is automatically controlled by a moisture-responsive element maintained in contact with the soil adjacent to the plant and operative upon contraction due to dryness of the soil to actuate valve means establishing flow communication from a source of water supply to the soil surrounding the plant.

It is a further important object of this invention to provide an irrigation system that is automatically controlled in accordance with the moisture needs of the plant-supporting soil to be irrigated, whereby substantial economy can be effected in the use of the water and by way of savings through the elimination of attendants.

Other and further important objects of this invention will become more apparent from the following description, particularly when taken in connection with the accompanying drawings, in which like parts are designated by like reefrence numerals, and in which:

FIGURE 1 is a vertical sectional view, partly in elevation, of an automatic plant waterer embodying the principles of my invention;

FIGURE 2 is an enlarged, fragmentary top plan view of the moisture-responsive element and the means for attaching the same to the container;

FIGURE 3 is a broken, enlarged vertical sectional view, partly in elevation, of the moisture-responsive element and parts associated therewith for the control of the moisture content of the soil in the automatic plant waterer of FIG. 1; and FIGURE 4 is a vertical sectional view, partly in elevation and partly schematic, illustrating as a modification of my invention an automatic irrigation system.

As shown on the drawings:

The reference numeral 10 indicates generally a container, such as a tub, box, planter, or the like, having a bottom wall 11, sloping vertical walls 12 and 13, and a false bottom 14 parallel to, but spaced from the real bottom 11 to provide a lower space 15 for holding water. Above the false bottom 14, the resulting space 16 is adapted to be filled with soil 17 to a certain level for the growing of a plant indicated generally by the reference 18. The false bottom 14 may be of a porous character or may be perforated to the extent necessary to aerate the soil 17, or other aerating means may be supplied.

The upper space 16 is bounded by the upper portions of the outer walls of the container 10. A unit 19, including the moisture responsive element 25, is positioned toward said side wall 12 in said space 16 and extends through the false bottom 14. Said unit is held in place at the top by a bracket 22 engaged over the top of the side wall 12 as at 25. The container 10, including the bottom wall 11, side walls 12 and 13 and false bottom wall 14 may be constructed of any suitable material, such as wood, metal or plastic, or even a ceramic, but wood is preferred.

The upper portion of the moisture-responsive element 25 is positioned in an elongated casing 20 which provides a down-spout 21 into the container 10 for filling the bottom portion with water. Said moisture-responsive unit 25, as best shown in FIGS. 1 to 3, comprises a block of wood 26, preferably redwood because of its resistance to decay, which has been cut across the grain of the wood so that the grain ends are exposed, as at 27, on all lateral surfaces of the block. As illustrated, the block is of rectangular cross-section, but it may be circular in cross-section or of any other suitable form. At least one surface 27 of the block is in direct contact with the soil 17 throughout its extent. The block 25 may be composed of a single elongated block, or may be made up of superimposed sections.

The block 25 is a part of the assembly that includes the casing or partial housing 20, which may suitably be formed of sheet metal. The housing 20 is of U-shape in horizontal cross-section, with the block 26 positioned in the U-shaped housing between the side walls 29 and 30, and with an air space 31 (FIG. 2) between the block 26 and the inner wall 32 forming the bight of the U-shaped housing. The block 26 is secured in place within the housing by suitable securing means, such as tie wires 33, passing through enlarged apertures 33a in the side walls 29 and 30. As will be explained later, the space 31 not only provides the filling spout 21 for introducing water but also permits evaporation of moisture from the block 26 into the air filling such space, so that the block is free to "breathe" while in contact at one or more of its surfaces 27 with the soil 17.

A rod 35 extends axially freely through the block 26, with an extension 36 thereof reaching nearly to the bottom wall 11 of the container. The upper end of the block 25 is capped by a sheet metal strip 37 that is apertured to permit the threaded upper end of the rod 35 to extend freely therethrough. A nut 38 is threaded on said upper rod end against the metal piece 37.

The lower extended end 36 of the rod 35 is housed within a tube 40, which may be formed of glass or plastic, and which is provided at its top end with an apertured cap 41 and at its lower end with an apertured cap 42 having an enlarged opening 48. The extension 36 passes freely through both of said apertured caps and has an extreme lower end 43, which is threaded and on which there are assembled a valve washer 44, an abutment plate 45, a coiled spring 46 between said abutment plate 45 and the lower cap 42 surrounding the washer 44, and nuts 47 threaded upon the lower end 43 of the rod above and below the abutment plate and holding the assembly together.

The tube 40 is filled with a plurality of strands of a wick 50, which may be of suitable absorbent textile fiber or the like, but which are preferably formed of a glass fiber roving because of the inertness of glass to decay or deterioration. At the upper end of the tube 40, the tube is provided with a side opening 51 to permit the strands of wick 50 to extend out the tube and into the soil 17 around the plant 18. Strands of the wick may be rather widely distributed throughout the soil 17, as indicated by the separated wick extensions 53 (FIG. 1). A shield 54 of plastic film, or the like, is positioned between the lower end of the block 26, and the upper cap 41, with the rod 35 extending therethrough, in order to prevent moisture from passing directly from the wick to the block 26. The wick extensions 53 pass between the shield 54 and the false bottom 14 before being spread out in the soil 17.

In operation, the space 15 below the false bottom 14 is kept at least partially filled with water to constitute a supply of water 60 at all times. The water may be poured in through the downspout 21, down along the side wall 32 so as not to come into contact directly with the moisture-responsive block of wood 26. With the nut 38 properly adjusted and the unit 25 in position, the block 26 will contract in height if the soil 17 with which the surfaces 27 of the block are contacted is too dry. Upon contraction of the block 26, the coiled spring 46 tends to expand and to effect a separation between the lower cap 42 and the abutment plate 45, thereby allowing the valve washer 44 to rest freely on the upper nut 47 and permit the water to pass upwardly through the opening 48 in the cap 42 into the tube 40. Due to the wicking action, the water is conducted by the wick 50 and extensions 53 thereof into the soil 17. When the soil becomes sufficiently wet to cause the block 26 to expand, expansion of the block pushes the tube 40 down and causes valve washer 44 to seat against the lower cap 42 and cut off the supply of water to the wick. This cycle is repeated as often as the expansion or shrinkage of the block 26 occurs to an extent sufficient to close or open the access opening 48 in the lower cap 42 between the supply of water 60 and the wick 50.

As is apparent, the moisture-responsive unit can be adjusted by adjustment of the nut 38, either by turning the nut down, to adjust the normal position of the valve washer 44 to a more nearly closed position, or by loosening the nut to adjust the valve washer 44 to a normally more removed position with respect to the opening 48 in the lower cap 42. Thus, the control nut 38 can be set permanently for whatever kind of plant is being grown in the container 10, or it can be adjusted from time to time as the moisture requirements of the soil and plants vary. As previously pointed out, the block 26 is free to lose moisture into the air space 31 provided by the housing 20 on the other side of the block from the soil 17.

In the modification of the invention illustrated in FIG. 4, a somewhat different type of moisture-responsive unit, indicated generally by the reference numeral 70, is provided for controlling an irrigation system. In this case, the unit 70 comprises a block 71, similar to the block 26, and partially enclosed by a housing 72, which like the housing 20, provides an air space 73 on one side of the block 71 while leaving the other side of the block 71 exposed to contact with soil, indicated at 74, in order to establish good contact between the surface of the block 71 and the soil 74. A wick 75 is wrapped around the block 71 for the full height thereof and the ends 75a thereof extend into the soil adjacent the unit.

A bracket 80 serves to mount the block 71 and shield 72 in operative relationship to a valve 81. Said bracket 80 is in the form of a wide U, with an upper horizontal flange portion 83, a corresponding lower flange portion 84 parallel thereto, and a vertical web portion 85. The upper flange portion 83 is provided with a threaded aperture 86 through which extends the threaded stem of a bolt 87. The lower end of said bolt 87 bears against a non-rotating pad 88, carried by or resting against the upper surface of the block 71. The lower end of the block 71 rests upon a pad 92 attached to a stem, or rod, 90, which may constitute the stem of a plug valve 91, or a continuation of the regular valve stem. Said stem 90 extends freely through the body of the valve 81 and is internally bored and threaded at 82 to receive the lower threaded end of a rod 93. Said rod 93 extends freely through the block 71 and into the hollow stem of the bolt 87 to hold the block in vertical position.

The mounting of the lower end of the unit 70 with respect to the valve 81 is effected through the bracket 80 by means of a packing nut gland 94, forming a part of said valve 81 and through which the valve stem 90 extends. Said packing gland 94 is threaded upon the upper extended threaded portion 95 of the valve body to lie against the upper surface of the flange 84. The flange 84 is thus tightly held between the gland 94 and the body of the valve 81, with the result that the unit 70 is rigidly mounted with respect to said valve 81.

The body of the valve 81 includes internally a port 100, which is controlled by the lower surface of the plug valve 91. Water from a supply of water under pressure is admitted into the valve 81 through a tube or pipe 101, and, if the port 100 is open, the water flows through the body of the valve and out through the tube or pipe 102 to an underground irrigation system (not shown). In order to control the position of the plug valve 91, a coiled spring 103 is positioned under compression between the pad 92 at the lower end of the block 70 and the packing gland 94. The spring 103 thus normally tends to cause the plug valve 91 to open the port 100, but whether it is capable of performing this function will depend upon the state of expansion or contraction of the block 71. Where the block is in an expanded state, due to a sufficiency of moisture in the surrounding soil, the block will hold the valve shut against the compressive force of the spring 103, whereas when the block 71 is in a shrunk or contracted state, the spring 103 will urge the valve stem 90 upwardly to open the port 100. This condition will continue so long as the contracted length of the block 71 is such as to permit the coil spring 103 to function to open said port 100.

As before, adjustment of the operation of the unit 70 is provided, this time by means of the bolt 87 acting through the abutment plate 88 against the block 71. By turning down the bolt 87 greater pressure is exerted against the compression spring 103, thereby making necessary a greater degree of contraction or shrinkage of the block 71 if the spring is to lift the plug valve 91 and open the port 100. On the other hand, if it is desired to maintain the valve open with a higher moisture content in the soil, the bolt 87 is turned up to lessen the opposing force placed upon the compression spring 103.

A canopy 105 is positioned above the unit 70 in order to prevent rain or water from a sprinkler reaching the block directly and causing it to close prematurely. The shield 72 keeps the soil away from one side of the wooden block while permitting circulation of air and drying of the block when moisture is no longer coming from the soil, the release of moisture from the block 71 being into the air space 73.

It will be understood that modifications and variations may be effected without departing from the scope of the novel concepts of the present invention.

I claim as my invention:

1. In a system for controlling the moisture content of soil for the growth of plants therein,
  a supply of water, means for conducting water from said supply to the soil to be moistened, flow control means associated with said conductor means, and sensing means including a moisture-absorbing solid in contact with said soil and expansible in response to the moisture content thereof to operate said flow control means.

2. In a system as defined by claim 1, wherein, said sensing means comprises a column of a section of wood that is expansible and contractible in accordance with its moisture content and relatively resistant to decay.

3. In a system as defined by claim 2, wherein said section is formed of redwood and with the grain of the wood at right angles to the height of the column.

4. In a system for controlling the moisture content of soil to promote plant growth therein, a supply of water, water conducting means from said supply to said soil, valve means controlling the flow of water through said water conducting means, moisture expansible solid means in contact with the soil and responsive to the moisture content of said soil, and a connector between said expansible means and said valve means for controlling the latter in accordance with the state of expansion of said expansible means.

5. A system as defined by claim 4, wherein, said moisture expansible means is a column of wood arranged with the grain of the wood at right angles to the height of the column and with grain-exposed edges of said wood in contact with said soil.

6. A system as defined by claim 5, wherein, said wood is redwood.

7. A system as defined by claim 5, wherein the water conducting means is a water absorbent wick that extends into the immediate vicinity of a plant.

8. A system as defined by claim 4, wherein, said water supply is maintained under pressure and said water conducting means is part of an underground system for distributing water to said soil, said valve means includes a plug valve in said water conducting means, means for adjusting the operation of said plug valve, and said moisture expansible means is a column of wood having grain-exposed edges in contact with said soil.

9. An automatic plant watering device, comprising:

a container having a false bottom providing an upper portion for containing soil and a plant and a lower portion for containing water, a water conducting means in communication with both water and soil, expansible means comprising a section of wood having grain ends exposed to said soil and expansible in accordance with the moisture content thereof, means for controlling the conduction of water along said water conducting means, and a connector between said expansible means and said controlling means to actuate the latter in accordance with the moisture content of said soil.

10. A device as defined by claim 9, wherein, said wood is redwood.

References Cited by the Examiner

UNITED STATES PATENTS

| | | | |
|---|---|---|---|
| 1,675,302 | 6/1928 | Roemer | 137—78 |
| 1,755,276 | 4/1930 | Somers | 137—78 |
| 2,445,717 | 7/1948 | Richards | 47—38.1 |
| 2,768,027 | 10/1956 | Nelson | 239—63 X |
| 2,785,007 | 3/1957 | Jenson | 239—64 X |

ABRAHAM G. STONE, *Primary Examiner.*

J. R. OAKS, *Assistant Examiner.*